(12) United States Patent
Kim et al.

(10) Patent No.: US 12,412,325 B2
(45) Date of Patent: Sep. 9, 2025

(54) METHOD, SERVICE SERVER, AND COMPUTER-READABLE MEDIUM FOR VISUALIZING DATA TO SELECT DATA TO BE USED FOR LABELING

(71) Applicant: SELECT STAR, INC., Daejeon (KR)

(72) Inventors: Seyeob Kim, Seoul (KR); Munhwi Jeon, Seoul (KR); Barom Kang, Seoul (KR); Namgil Kim, Bucheon-si (KR)

(73) Assignee: SELECT STAR, INC., Daejeon (KR)

( * ) Notice: Subject to any disclaimer, the term of this patent is extended or adjusted under 35 U.S.C. 154(b) by 36 days.

(21) Appl. No.: 17/994,279

(22) Filed: Nov. 26, 2022

(65) Prior Publication Data

US 2024/0144557 A1  May 2, 2024

(30) Foreign Application Priority Data

Oct. 28, 2022 (KR) .................. 10-2022-0141675

(51) Int. Cl.
*G09G 5/00* (2006.01)
*G06F 16/54* (2019.01)
*G06F 16/56* (2019.01)
*G06F 16/583* (2019.01)
*G06T 11/20* (2006.01)

(52) U.S. Cl.
CPC ............ *G06T 11/206* (2013.01); *G06F 16/54* (2019.01); *G06F 16/56* (2019.01); *G06F 16/5838* (2019.01)

(58) Field of Classification Search
CPC ......... G06T 11/60; G06T 19/00; G06T 11/00; G06T 11/20; G06T 11/206; G06F 9/4443; G06F 3/0481; G06F 30/13; G06F 3/04845; G06F 3/04883; G06F 40/143; G06F 16/54; G06F 16/56; G06F 16/5838; G06V 20/20
USPC ....................................... 345/619
See application file for complete search history.

(56) References Cited

U.S. PATENT DOCUMENTS

| | | | | |
|---|---|---|---|---|
| 9,990,687 | B1* | 6/2018 | Kaufhold | G06N 3/045 |
| 2009/0282063 | A1* | 11/2009 | Shockro | G06F 3/0483 |
| 2014/0068487 | A1* | 3/2014 | Steiger | A61B 5/7275 |
| | | | | 715/771 |
| 2018/0144518 | A1* | 5/2018 | Vlassis | G06T 11/206 |
| 2023/0306761 | A1* | 9/2023 | Sirbulescu | G06T 7/0012 |

\* cited by examiner

*Primary Examiner* — Gordon G Liu (57) ABSTRACT

The present invention relates to a method, a service server, and a computer-readable medium for visualizing data to select data to be used for labeling, and more particularly, to a method, a service server, and a computer-readable medium for visualizing data to select data to be used for labeling, capable of enabling a user to select data to be used as learning data by deriving a plurality of feature vector for a plurality of data included in an original dataset, reducing dimensions of each of the feature vectors to three or less dimensions, displaying the feature vectors with the reduced dimensions on a plane of the three or less dimensions, and providing a visualization interface including the plane of the three or less dimensions to a user terminal.

4 Claims, 9 Drawing Sheets

METHOD, SERVICE SERVER, AND COMPUTER-READABLE MEDIUM FOR VISUALIZING DATA TO SELECT DATA TO BE USED FOR LABELING

BACKGROUND OF THE INVENTION

1. Field of the Invention

The present invention relates to a method, a service server, and a computer-readable medium for visualizing data to select data to be used for labeling, and more particularly, to a method, a service server, and a computer-readable medium for visualizing data to select data to be used for labeling, capable of enabling a user to select data to be used as learning data by deriving a plurality of feature vector for a plurality of data included in an original dataset, reducing dimensions of each of the feature vectors to three or less dimensions, displaying the feature vectors with the reduced dimensions on a plane of the three or less dimensions, and providing a visualization interface including the plane of the three or less dimensions to a user terminal.

2. Description of the Related Art

Recently, as various services based on artificial intelligence researches and artificial intelligence that is developed appear, efforts have been made to develop more advanced artificial intelligence models. In detail, in recent years, researches have been conducted to improve a structure of a machine learning model and improve an amount and quality of learning data used for training the machine learning model.

In general, in order to collect the learning data, the learning data may be constructed through a process for processing a large amount of raw data retained by companies to allow the raw data to be suitable for the training. For example, in order to train a machine learning model for identifying a person included in an image, a region of the person included in each of the raw data may be labeled to construct learning data for the machine learning model.

Meanwhile, since an amount of raw data retained by a company is very large, which is up to millions, not tens, it may be difficult for the company to process the raw data into learning data. In order to solve the above problem, conventionally, crowdsourcing has been used to provide an operation for processing the raw data into the learning data to a plurality of operators, and provide a reward for the operation to the operator, so that a large amount of learning data may be rapidly constructed.

However, the crowdsourcing may only effectively shorten a time required to construct a large amount of learning data, so that it may be difficult to improve quality of the learning data constructed through the crowdsourcing. As in the example described above, when there are more images that do not include a person than images that include a person, or majority of images include a person of a specific race in learning data for training the machine learning model for identifying a person, performance degradation of the machine learning model that has been trained with the learning data is inevitable. Therefore, in order to resolve the above problem, learning data with excellent quality is required, and in order to construct the learning data with excellent quality, it is important to select only valid data from a large amount of raw data, which is the basis of the learning data. In addition, since an amount of raw data retained by a company is very huge, in order to reduce a time and a cost for constructing learning data with a large amount of raw data, a process for selecting raw data for constructing learning data rather than a process for constructing learning data with entire raw data is required.

Meanwhile, since the raw data is simply labeled to construct the learning data in the case of the crowdsourcing described above, the process for selecting the raw data has not been performed.

As described above, in order to effectively train a machine learning model, and in order to reduce a time required for constructing learning data and performing training with the learning data, there is a demand to develop a method for selecting raw data that are suitable for training a machine learning model before constructing learning data by performing a labeling operation on raw data on a user side that desires to construct the learning data.

SUMMARY OF THE INVENTION

The present invention relates to a method, a service server, and a computer-readable medium for visualizing data to select data to be used for labeling, and more particularly, an object of the present invention is to provide a method, a service server, and a computer-readable medium for visualizing data to select data to be used for labeling, capable of enabling a user to select data to be used as learning data by deriving a plurality of feature vector for a plurality of data included in an original dataset, reducing dimensions of each of the feature vectors to three or less dimensions, displaying the feature vectors with the reduced dimensions on a plane of the three or less dimensions, and providing a visualization interface including the plane of the three or less dimensions to a user terminal.

To achieve the object described above, according to one embodiment of the present invention, there is provided a method for visualizing data to select data to be used for labeling, which is performed by a service server configured to communicate with a user terminal and including at least one processor and at least one memory, the method including: a feature vector derivation step of inputting an original dataset including N data (where N is a natural number that is greater than or equal to 2) provided by the user terminal to a feature embedding model so as to derive a feature vector for each of the N data; a dimension reduction step of reducing dimensions of each of the N feature vectors derived through the feature vector derivation step to three or less dimensions; and a visualization interface provision step of displaying the N feature vectors with the reduced dimensions on a plane of the three or less dimensions, and providing a visualization interface in which the plane of the three or less dimensions including the N feature vectors with the reduced dimensions is visually displayed to the user terminal.

According to one embodiment of the present invention, the visualization interface may be configured to display the N feature vectors with the reduced dimensions displayed on the plane of the three or less dimensions in a first color, and change, when one feature vector is selected according to selection of a user on the user terminal, a color of the one feature vector into a second color to display the one feature vector in the second color.

According to one embodiment of the present invention, when one feature vector is selected among the N feature vectors with the reduced dimensions displayed on the plane of the three or less dimensions, the visualization interface may be configured to display data corresponding to the one feature vector.

According to one embodiment of the present invention, the feature embedding model may correspond to one encoder corresponding to a data type of the original dataset in a machine learning model including a plurality of encoders corresponding to a plurality of data types to derive feature vectors for data of the data types, respectively.

According to one embodiment of the present invention, the method for visualizing the data to select the data to be used for the labeling may use M data (where M is a natural number that is less than N) corresponding to M feature vectors with reduced dimensions selected by a user on the plane of the three or less dimensions included in the visualization interface displayed on the user terminal as a target of a labeling operation.

To achieve the object described above, according to one embodiment of the present invention, there is provided a service server configured to communicate with a user terminal and including at least one processor and at least one memory so as to perform a method for visualizing data to select data to be used for labeling, wherein the service server is configured to perform: a feature vector derivation step of inputting an original dataset including N data (where N is a natural number that is greater than or equal to 2) provided by the user terminal to a feature embedding model so as to derive a feature vector for each of the N data; a dimension reduction step of reducing dimensions of each of the N feature vectors derived through the feature vector derivation step to three or less dimensions; and a visualization interface provision step of displaying the N feature vectors with the reduced dimensions on a plane of the three or less dimensions, and providing a visualization interface in which the plane of the three or less dimensions including the N feature vectors with the reduced dimensions is visually displayed to the user terminal.

To achieve the object described above, according to one embodiment of the present invention, there is provided a computer-readable medium for implementing a method for visualizing data to select data to be used for labeling, which is performed by a service server configured to communicate with a user terminal and including at least one processor and at least one memory, wherein the computer-readable medium includes computer-executable instructions for allowing the service server to perform: a feature vector derivation step of inputting an original dataset including N data (where N is a natural number that is greater than or equal to 2) provided by the user terminal to a feature embedding model so as to derive a feature vector for each of the N data; a dimension reduction step of reducing dimensions of each of the N feature vectors derived through the feature vector derivation step to three or less dimensions; and a visualization interface provision step of displaying the N feature vectors with the reduced dimensions on a plane of the three or less dimensions, and providing a visualization interface in which the plane of the three or less dimensions including the N feature vectors with the reduced dimensions is visually displayed to the user terminal.

According to one embodiment of the present invention, a visualization interface that allows a user to select a predetermined number of data among a plurality of data included in an original dataset may be provided to the user, so that the user can select data for constructing learning data required to train a machine learning model.

According to one embodiment of the present invention, dimensions of a plurality of feature vectors for each of a plurality of data may be reduced, and the feature vectors with the reduced dimensions may be displayed on a plane of three or less dimensions, so that the user can easily and visually recognize distribution of the data.

According to one embodiment of the present invention, the visualization interface displayed on a terminal of the user may include the plane of the three or less dimensions including the feature vectors with the reduced dimensions, and the user may select the feature vector on the plane to cancel selection of a selected feature vector or to select an unselected feature vector, so that the user can easily select the data.

According to one embodiment of the present invention, the visualization interface displayed on the terminal of the user may include the plane of the three or less dimensions including the feature vectors with the reduced dimensions, and when the user selects one feature vector on the plane, data for the feature vector may be displayed on the terminal of the user, so that the user can recognize the data more easily.

DETAILED DESCRIPTION OF THE INVENTION

Hereinafter, various embodiments and/or aspects will be described with reference to the drawings. In the following description, numerous specific details are set forth in order to provide a thorough understanding of one or more aspects for the purpose of explanation. However, it will also be appreciated by a person having ordinary skill in the art that such aspect(s) may be carried out without the specific details. The following description and accompanying drawings will be set forth in detail for specific illustrative aspects among one or more aspects. However, the aspects are merely illustrative, some of various ways among principles of the various aspects may be employed, and the descriptions set forth herein are intended to include all the various aspects and equivalents thereof.

In addition, various aspects and features will be presented by a system that may include a plurality of devices, components and/or modules or the like. It will also be understood and appreciated that various systems may include additional devices, components and/or modules or the like, and/or may not include all the devices, components, modules or the like recited with reference to the drawings.

The term "embodiment", "example", "aspect", "exemplification", or the like as used herein may not be construed in that an aspect or design set forth herein is preferable or advantageous than other aspects or designs. The terms 'unit', 'component', 'module', 'system', 'interface' or the like used in the following generally refer to a computer-related entity, and may refer to, for example, hardware, software, or a combination of hardware and software.

In addition, the terms "include" and/or "comprise" specify the presence of the corresponding feature and/or component, but do not preclude the possibility of the presence or addition of one or more other features, components or combinations thereof.

In addition, the terms including an ordinal number such as first and second may be used to describe various components, however, the components are not limited by the terms. The terms are used only for the purpose of distinguishing one component from another component. For example, the first component may be referred to as the second component without departing from the scope of the present invention, and similarly, the second component may also be referred to as the first component. The term "and/or" includes any one of a plurality of related listed items or a combination thereof.

In addition, in embodiments of the present invention, unless defined otherwise, all terms used herein including technical or scientific terms have the same meaning as commonly understood by those having ordinary skill in the art. Terms such as those defined in generally used dictionaries will be interpreted to have the meaning consistent with the meaning in the context of the related art, and will not be interpreted as an ideal or excessively formal meaning unless expressly defined in the embodiment of the present invention.

Figure 1:
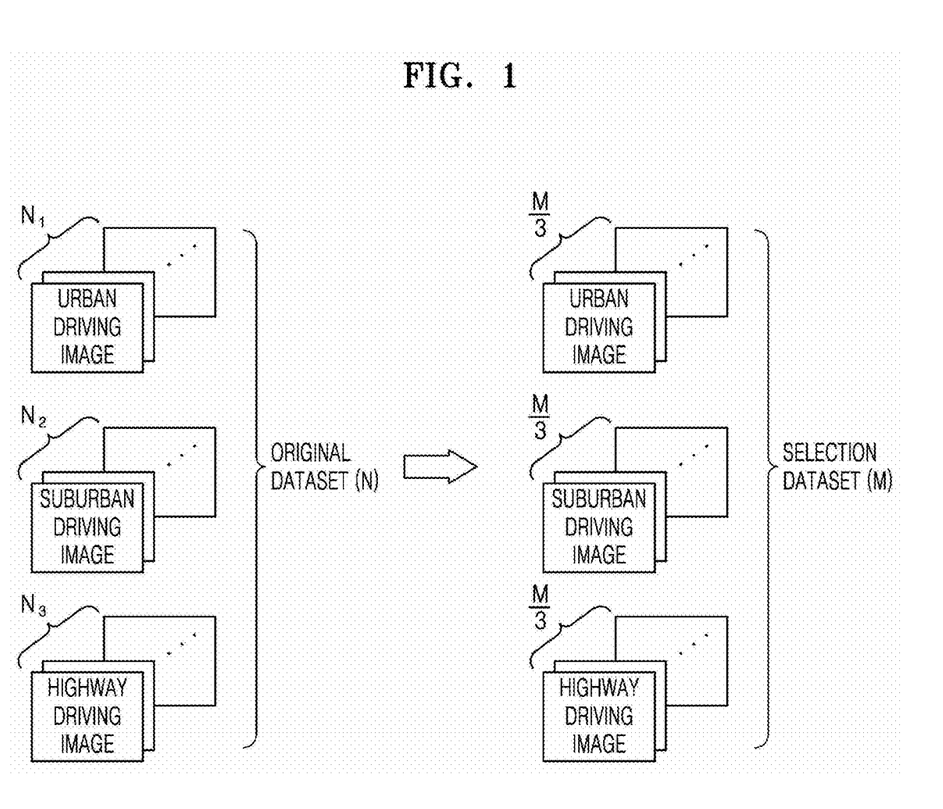
FIG. 1 schematically shows a predetermined number of data selected from a plurality of data included in an original dataset according to one embodiment of the present invention.

FIG. 1 schematically shows a predetermined number of data selected from a plurality of data included in an original dataset according to one embodiment of the present invention.

As shown in FIG. 1, an original dataset that is retained by an entity that desires to construct learning data to train a machine learning model, such as a company, or provided from an outside may include a plurality of data. Hereinafter, the number of data included in the original dataset will be set as N, and N may correspond to a natural number that is greater than or equal to 2. In addition, the data included in the original dataset may be understood as corresponding to raw data described above.

Meanwhile, the original dataset may include various data. For example, when the original dataset is to be used for training a machine learning model for autonomous driving, the original dataset may include $N_1$ urban driving images, $N_2$ suburban driving images, and $N_3$ highway driving images, and a value obtained by adding all of $N_1$, $N_2$, and $N_3$ may correspond to N.

Proportions of the data included in the original dataset, that is, proportions of $N_1$, $N_2$, and $N_3$ may be different from each other. For example, in the original dataset, the proportion of $N_1$ may be 70%, the proportion of $N_2$ may be 25%, and the proportion of $N_3$ may be 5%, and when an entire original dataset configured to have the above proportions is used as the learning data, the machine learning model may be inevitably trained to be biased toward urban driving.

Therefore, according to the present invention, a process for selecting data to be used as learning data among a plurality of data included in an original data may be performed so that the machine learning model may be trained to meet target performance.

In detail, according to the present invention, M data (where M is a natural number that is less than N) among N data included in the original dataset may be selected. A set of the data selected as described above may be included in a selection dataset, and the selection dataset may include, for example, data having the same proportion for each type. As in the example described above, while the machine learning model processes the autonomous driving, when it is effective to perform the training with learning data in which $N_1$ to $N_3$ have the same proportion, or an entity that retains the original dataset sets the proportions of $N_1$ to $N_3$ to be the same, the selection dataset may include M/3 urban driving images, M/3 suburban driving images, and M/3 highway driving images.

As describing above, instead of performing the training with the original dataset, the selection dataset selected from the original dataset by the user may be constructed as the learning data to train the machine learning model according to the present invention, so that a time required for the training may be reduced, and performance of the machine learning model may be improved.

Meanwhile, according to the present invention, the selection of the data from the original dataset is not limited to selection performed such that data for each type have the same proportion as in the example described above. For example, the selection of the data from the original dataset may be understood as corresponding to one of various selection schemes such as exclusion of data that is unnecessary for training the machine learning model when the unnecessary data is included in the original dataset, or selection of data in which a proportion of data for each type is arbitrarily set.

Figure 2:
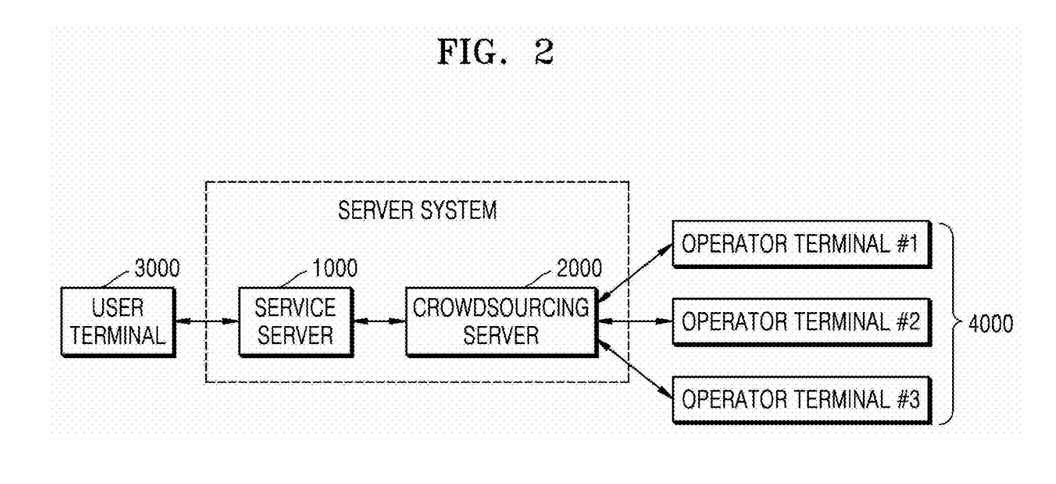
FIG. 2 schematically shows components for performing a method for visualizing data to select data to be used for labeling according to one embodiment of the present invention.

FIG. 2 schematically shows components for performing a method for visualizing data to select data to be used for labeling according to one embodiment of the present invention.

As shown in FIG. 2, according to the present invention, a method for visualizing data to select data to be used for labeling may be performed by a service server 1000, and in order to perform the method for visualizing the data to select the data to be used for the labeling according to the present invention, the service server 1000 may select a part of the data visualized through the method and communicate with a user terminal 3000 of the user who desires to train the machine learning model by using the selected data as the learning data.

In detail, a use entity of the user terminal 3000 may correspond to the user who desires to construct the learning data by using a predetermined number (M) of data, which is extracted from N data included in the original dataset, and train the machine learning model of the user by using the learning data. Accordingly, the user terminal 3000 may provide the original dataset to the service server 1000, and the service server 1000 may visualize the N data included in the received original dataset and provide a result of the visualization to the user terminal 3000.

The service server 1000 may perform the method for visualizing the data to select the data to be used for the labeling according to the present invention, and may display a visualization result on a separate interface to provide the interface to the user terminal 3000. An internal configuration of the service server 1000 will be described in detail with reference to FIG. 3 that will be described below.

Meanwhile, as described above, the service server 1000 may provide a visualization result for the N data included in the original dataset to the user terminal 3000, and additionally, the service server 1000 may receive information on selection of the M data selected by the user based on the visualization result from the user terminal 3000, so that a selection dataset including the M data selected by the user may be transmitted to a crowdsourcing server 2000.

The crowdsourcing server 2000 may perform the labeling (operation) on each of the M data through crowdsourcing in order to process a plurality (M) of data included in the selection dataset provided from the service server 1000 or the user terminal 3000, that is, in order to perform the labeling on each of the M data, and may provide the M data labeled through the crowdsourcing to the user terminal 3000 through the service server 1000 or directly provide the M data labeled through the crowdsourcing to the user terminal 3000.

In more detail, the crowdsourcing server 2000 may communicate with a plurality of operator terminals 4000 in order to label the data in a crowdsourcing scheme, and may provide the selected M data to the operator terminals 4000, respectively.

Meanwhile, the operator terminals 4000 may receive some of the M data that are operation targets from the crowdsourcing server 2000, and may transmit data labeled according to an input of an operator to the crowdsourcing server 2000. As described above, the crowdsourcing server 2000 may collect the data (labeled data) processed by the operators through the crowdsourcing and provide the collected data to the service server 1000 or the user terminal 3000, so that the user may use the data that has been subject to an operation as the learning data.

As described above, although the service server 1000 and the crowdsourcing server 2000 have been shown in FIG. 2 as being included in a server system, according to another embodiment of the present invention, the crowdsourcing server 2000 may be included in an external system that is different from the system including the service server 1000.

In addition, according to another embodiment of the present invention, the crowdsourcing server 2000 may not correspond to a separate server, in which the service server 1000 may additionally perform an operation performed by the crowdsourcing server 2000, or internal components included in the crowdsourcing server 2000 may be additionally included in the service server 1000.

Figure 3:
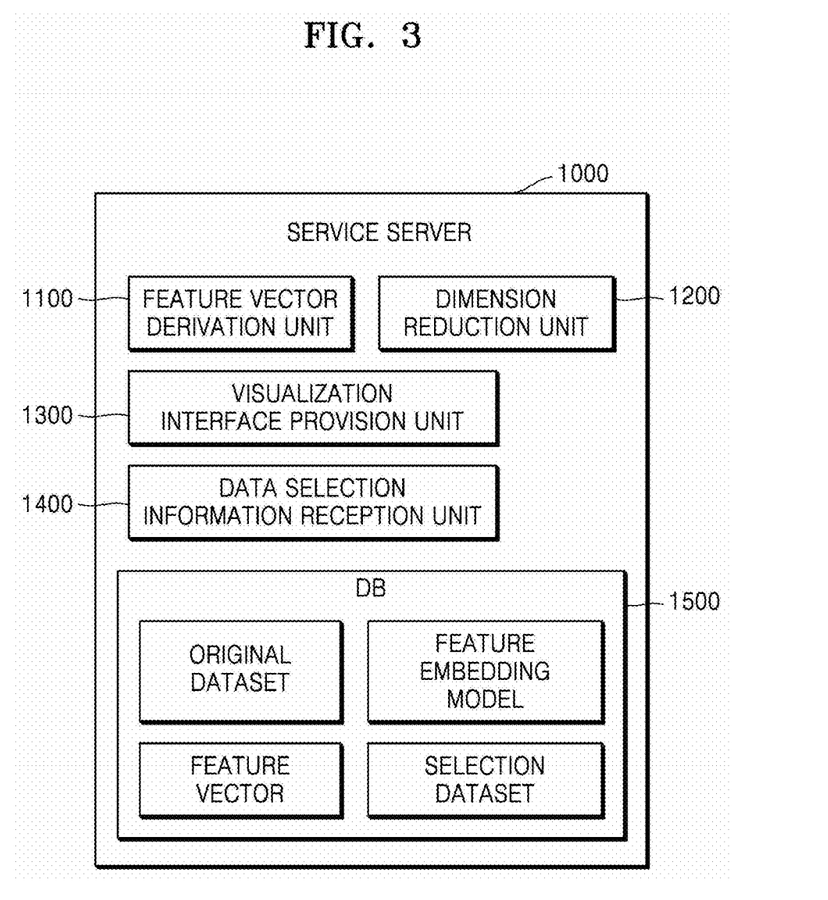
FIG. 3 schematically shows internal components of a service server according to one embodiment of the present invention.

FIG. 3 schematically shows internal components of a service server 1000 according to one embodiment of the present invention.

As shown in FIG. 3, in order to perform the method for visualizing the data to select the data to be used for the labeling according to the present invention, the service server 1000 may include a feature vector derivation unit 1100, a dimension reduction unit 1200, a visualization interface provision unit 1300, a data selection information reception unit 1400, and a DB 1500.

In detail, the feature vector derivation unit 1100 may perform a feature vector derivation step S100, and may derive a feature vector for each of the N data included in the original dataset provided from the user terminal 3000 of the user. In more detail, the feature vector derivation unit 1100 may use a feature embedding model to input the N data to the feature embedding model so as to derive the feature vector for each of the N data. The feature vectors may be used to visualize data by the visualization interface provision unit 1300 that will be described below.

The dimension reduction unit 1200 may perform a dimension reduction step S110, and may reduce dimensions of the N feature vectors to three or less dimensions. As described above, the dimension reduction unit 1200 may reduce the dimension of the feature vector to a predetermined dimension or less so that the position of the feature vector may be visually displayed.

The visualization interface provision unit 1300 may perform a visualization interface provision step S120, and may visualize the N feature vectors having the dimensions reduced to the three or less dimensions by the dimension reduction unit 1200 and provide the visualization result to the user terminal 3000. In detail, the visualization interface provision unit 1300 may display the N feature vectors having the dimensions reduced to the three or less dimensions on a plane of the three or less dimensions, and may provide a visualization interface 1310 including the plane of the three or less dimensions to the user terminal 3000. In other words, the visualization interface provision unit 1300 may display positions of the N feature vectors with the reduced dimensions on a plane corresponding to a size of the dimensions reduced by the dimension reduction unit 1200, and provide a display result to the user through the visualization interface 1310.

The data selection information reception unit 1400 may perform a data selection information reception step S130, and may receive information on the M data selected among the N data according to an input of the user of the user terminal 3000 on which the visualization interface 1310 is displayed from the user terminal 3000. As described above, the M data included in the original dataset may be provided to the crowdsourcing server 2000 or the user terminal 3000 according to the information on the M data received by the data selection information reception unit 1400, so that an operation (labeling) may be performed on the M data.

The DB 1500 may store information derived by the service server 1000 or received by the service server 1000 from an external component such as the user terminal 3000 in order to perform the method for visualizing data to select the data to be used for the labeling according to the present invention. For example, the DB 1500 may store the original dataset provided from the user terminal 3000, the feature embedding model used by the feature vector derivation unit 1100 to derive the feature vector for each of the N data included in the original dataset, the feature vector derived by the feature vector derivation unit 1100, and the selection dataset including the M data selected by the user, which is received by the data selection information reception unit 1400.

Figure 4:
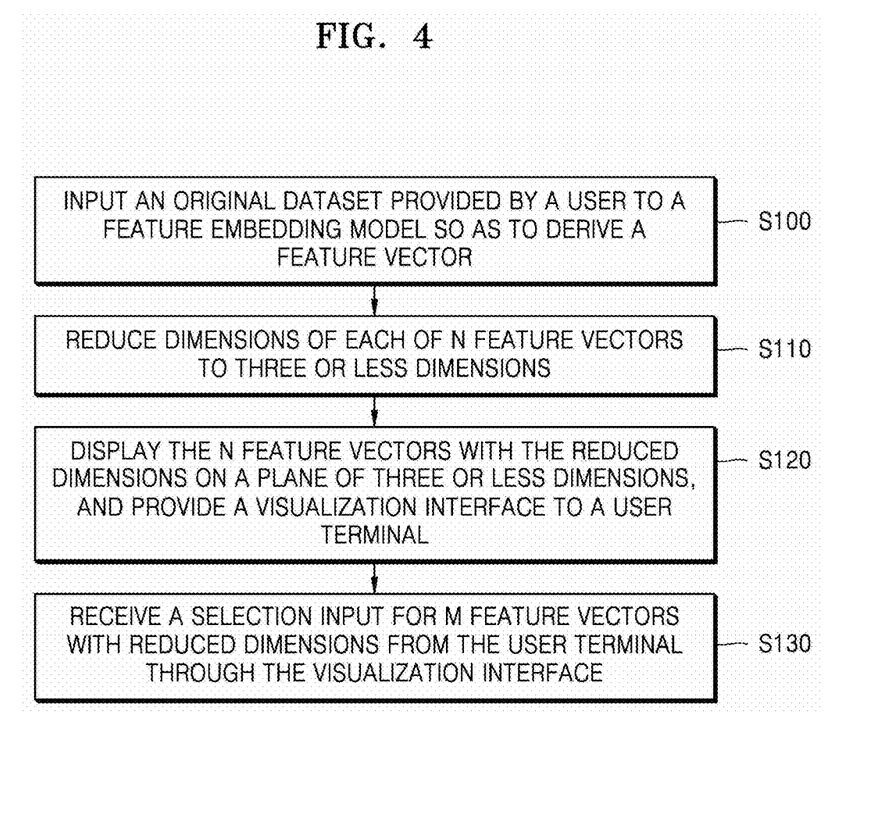
FIG. 4 schematically shows detailed steps of the method for visualizing the data to select the data to be used for the labeling according to one embodiment of the present invention.

FIG. 4 schematically shows detailed steps of the method for visualizing the data to select the data to be used for the labeling according to one embodiment of the present invention.

As shown in FIG. 4, the method for visualizing the data to select the data to be used for the labeling, which is performed by the service server 1000 configured to communicate with the user terminal 3000 and including at least one processor and at least one memory, may include: a feature vector derivation step S100 of inputting an original dataset including N data (where N is a natural number that is greater than or equal to 2) provided by the user terminal 3000 to a feature embedding model so as to derive a feature vector for each of the N data; a dimension reduction step S110 of reducing dimensions of each of the N feature vectors derived through the feature vector derivation step S100 to three or less dimensions; and a visualization interface provision step S120 of displaying the N feature vectors with the reduced dimensions on a plane of the three or less dimensions, and providing a visualization interface 1310 in which the plane of the three or less dimensions including the N feature vectors with the reduced dimensions is visually displayed to the user terminal.

In detail, in the feature vector derivation step S100, the N data included in the original dataset that is directly or indirectly provided by the user may be input to the feature embedding model so as to derive a feature vector having K dimensions (where K is a natural number that is greater than or equal to 2).

In more detail, the original dataset may be transmitted by the user to the service server 1000 through the user terminal 3000, or the original dataset may be provided by the user from the service server 1000 through a computer-readable medium such as a USB in which the original dataset is stored. Meanwhile, the feature embedding model may be a machine learning model that receives predetermined data and derives a feature vector having K dimensions as a result of the reception. In detail, the feature vector may have K components, and a number of the components may be understood as corresponding to a number of dimensions. The feature embedding model will be described below with reference to FIGS. 5 and 6.

In the dimension reduction step S110, the dimensions of the N feature vectors derived in the feature vector derivation step S100 may be reduced to the three or less dimensions. To this end, in the dimension reduction step S110, one scheme among various conventional schemes such as t-distributed stochastic neighbor embedding (T-SNE) and principal component analysis (PCA), which are used to reduce dimensions of a vector, may be used to reduce the dimensions of the feature vector to the three or less dimensions.

In the dimension reduction step S110, the dimensions of the feature vector having the K dimensions may be reduced to the three or less dimensions so as to cause as less loss as possible, and the feature vector with the dimensions reduced as described above may be used to visually display data at a specific position on a plane.

In the visualization interface provision step S120, the N feature vectors having the dimensions reduced through the dimension reduction step S110 as described above may be displayed on the plane of the three or less dimensions, and a display result may be transmitted to the user terminal 3000. In detail, in the visualization interface provision step S120, the N feature vectors with the reduced dimensions may be displayed on the plane, the visualization interface 1310 including the plane on which the N feature vectors with the reduced dimensions are displayed may be provided to the user terminal 3000, and the visualization interface 1310 may be displayed on the user terminal 3000.

As described above, through the visualization interface 1310 displayed on the user terminal 3000, the user may visually recognize distribution of the N data visualized by the service server 1000, and may select the M data among the N data.

In the data selection information reception step S130, a selection input for the M data input by the user on the visualization interface 1310 provided to the user terminal 3000 through the visualization interface provision step S120 may be received. As described above, based on the selection input for the M data received in the data selection information reception step S130, the service server 1000 may generate the selection dataset including the M data selected by the user among the N data included in the original dataset, and may provide the selection dataset to the user terminal 3000 or the crowdsourcing server 2000.

According to the present invention, a visualization result for the N data, more specifically, distribution based on a degree of relation among the N data may be provided to the user so as to allow the user to select the M data that are suitable for the training among the N data included in the original dataset through the above process, so that the user may easily select the data to be used as the learning data.

Figure 5:
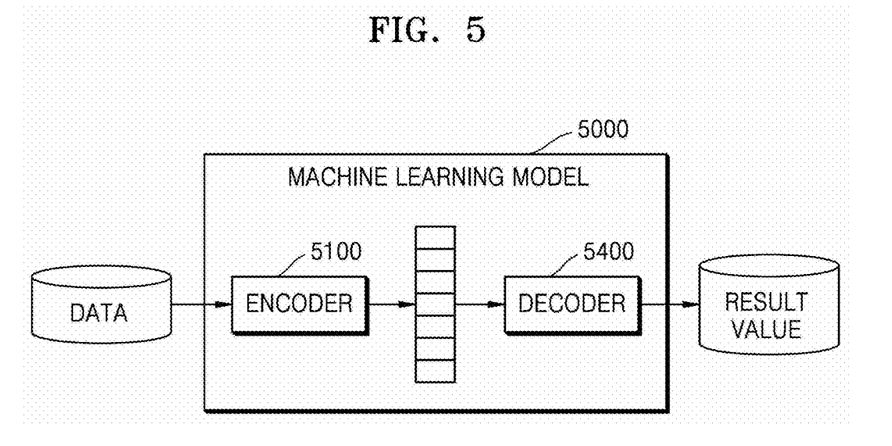
FIG. 5 schematically shows a configuration of a machine learning model used as a feature embedding model according to one embodiment of the present invention.

FIG. 5 schematically shows a configuration of a machine learning model 5000 used as a feature embedding model according to one embodiment of the present invention.

As shown in FIG. 5, according to one embodiment of the present invention, the feature embedding model used to derive the feature vector for the data in the feature vector derivation step S100 may correspond to a machine learning model 5000 shown in FIG. 5 or one of internal components of the machine learning model 5000.

In detail, the machine learning model 5000 may include an encoder 5100 and a decoder 5200. The encoder 5100 may serve to collect and compress data input to the machine learning model 5000, and the decoder 5200 may serve to decompress the data compressed by the encoder 5100 so that the data derived by the decoder 5200 may correspond to an output (result value) of the machine learning model 5000.

For example, when an image including a dog is input to the machine learning model 5000, the encoder 5100 may receive the image and output information on the image in a vector form, and the decoder 5200 may receive an output of the encoder 5100 and output information for determining whether the image is an image of a dog based on values included in a vector.

Meanwhile, the machine learning model 5000 may be trained by using the learning data so that the encoder 5100 may output a feature vector that may represent information on the input data. In this case, according to the present invention, the feature embedding model may correspond to the encoder 5100 of the trained machine learning model 5000.

Figure 6:
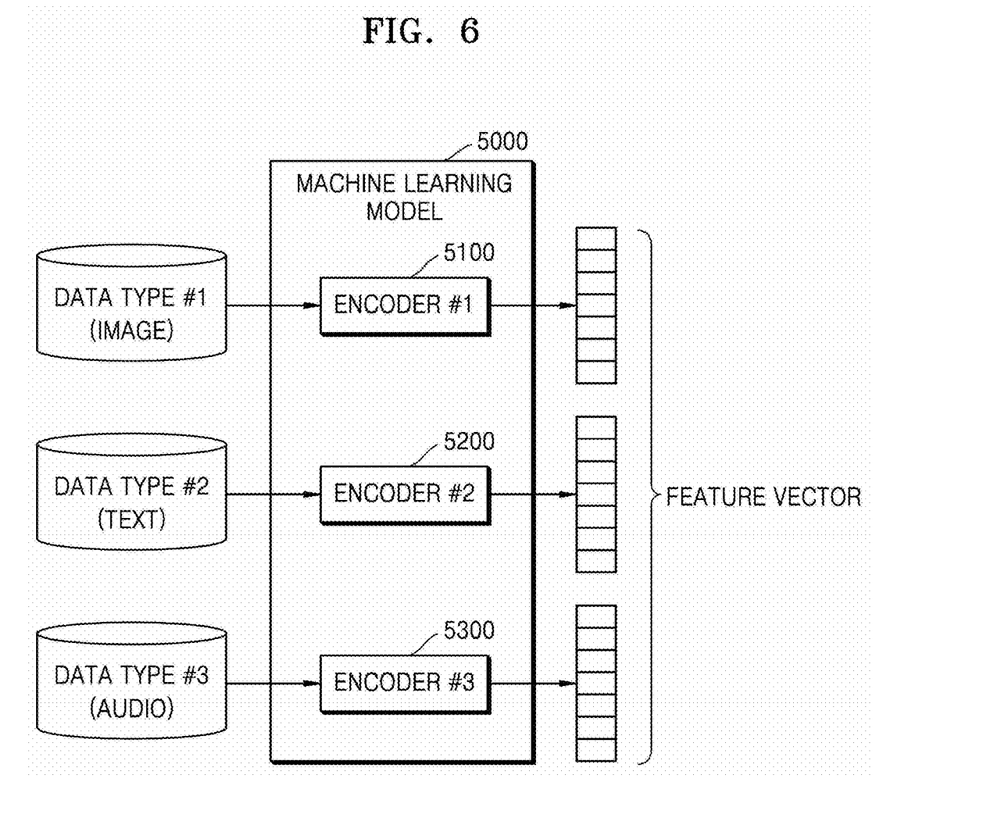
FIG. 6 schematically shows a configuration of a machine learning model used as a feature embedding model according to another embodiment of the present invention.

FIG. 6 schematically shows a configuration of a machine learning model 5000 used as a feature embedding model according to another embodiment of the present invention.

As shown in FIG. 6, the feature embedding model may correspond to one encoder corresponding to a data type of the original dataset in the machine learning model 5000 including a plurality of encoders 5100 to 5300 corresponding to a plurality of data types to derive feature vectors for data of the data types, respectively.

In detail, as shown in FIG. 6, according to another embodiment of the present invention, the feature embedding model used to derive the feature vector for the data in the feature vector derivation step S100 may correspond to a machine learning model 5000 shown in FIG. 6 or one of internal components of the machine learning model 5000.

The machine learning model 5000 shown in FIG. 6 may include a plurality of encoders 5100 to 5300, and the encoders 5100 to 5300 may receive data of specific types corresponding to the encoders 5100 to 5300 and derive feature vectors for the data, respectively. For example, an encoder #1 5100 may receive data in an image form (Data type #1) and derive a feature vector for image data, an encoder #2 5200 may receive data in a text form (Data type #2) and derive a feature vector for text data, and an encoder #3 5300 may receive data in an audio form (Data type #3) and derive a feature vector for audio data. In other words, the machine learning model 5000 shown in FIG. 6 may correspond to a multimodal-based machine learning model 5000 that receives various types of data and derives a feature vector for the received data.

Meanwhile, the machine learning model 5000 may be trained to receive various types of data for the same object and allow the encoders 5100 to 5300 that have derived the feature vectors, respectively, to derive similar feature vectors. For example, when a type of the image data is an image including a dog, a type of the text data is a text including a dog, and a type of the audio data is an audio with a voice pronouncing a dog, the training may be performed such that the encoders #1 to #3 5100 to 5300 for deriving feature vectors for the data may derive similar or identical feature vectors.

As described above, the encoder corresponding to the type of the data included in the original dataset in the trained machine learning model 5000 may correspond to the feature embedding model used in the feature vector derivation step S100. For example, when image data are included in the original dataset, the feature embedding model may correspond to the encoder #1 5100 that receives data of an image type included in the trained machine learning model 5000 and derives a feature vector.

Meanwhile, according to another embodiment of the present invention, when at least two types of data are included in the original dataset, the feature embedding model may be understood as including at least two encoders that process the at least two types of data among the encoders 5100 to 5300 included in the trained machine learning model 5000.

In addition, a number of the encoders 5100 to 5300 included in the multimodal-based machine learning model 5000 is not limited to a number shown in FIG. 6, and the machine learning model 5000 may be understood as including a plurality of encoders including various types of data.

Figure 7A:
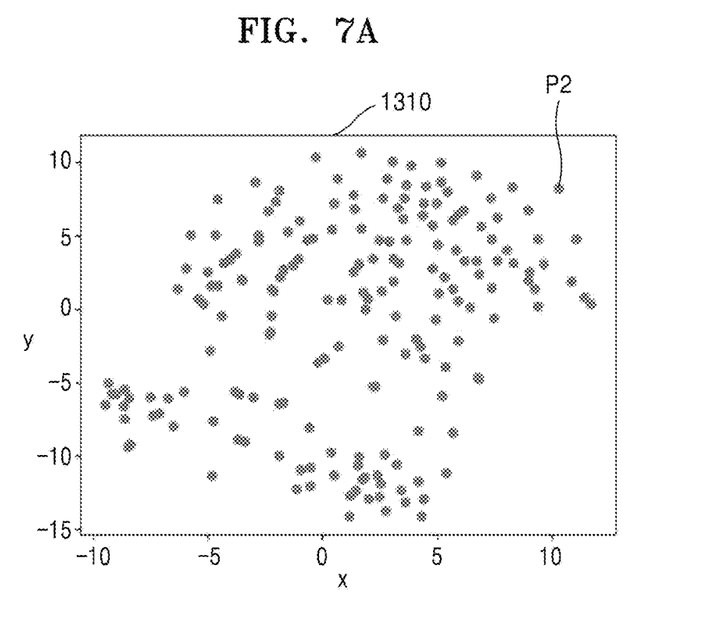
FIGS. 7A and 7B schematically show a visualization interface displayed on a user terminal according to one embodiment of the present invention.
Figure 7B:
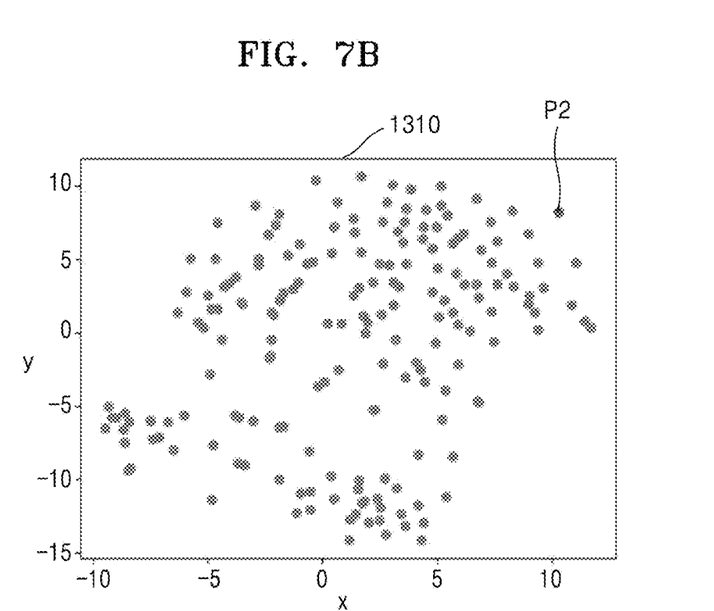

FIGS. 7A and 7B schematically show a visualization interface displayed on a user terminal according to one embodiment of the present invention.

As shown in 7A and 7B, the visualization interface 1310 may display the N feature vectors with the reduced dimensions displayed on the plane of the three or less dimensions in a first color, and may change, when one feature vector is selected according to selection of the user on the user terminal 3000, a color of the one feature vector into a second color to display the one feature vector in the second color.

In detail, in the visualization interface provision step S120, the visualization interface 1310 including the plane of the three or less dimensions on which the N feature vectors having the dimensions reduced to the three or less dimensions are displayed may be provided to the user terminal 3000.

FIG. 7A schematically shows the visualization interface 1310 displayed on the user terminal 3000 according to one embodiment of the present invention. As described above, the visualization interface 1310 may include the plane of the three or less dimensions including the N feature vectors with the reduced dimensions, and the N feature vectors with the reduced dimensions displayed on the plane of the three or less dimensions may be displayed in the first color.

According to an example shown in FIG. 7A, the N feature vectors with the reduced dimensions may be displayed in a purple color corresponding to the first color on the visualization interface 1310.

Meanwhile, the plane of the three of less dimensions on which the N feature vectors with the reduced dimensions are displayed may be understood as displaying distribution of the N feature vectors. In detail, distribution in which a degree of relation among feature vectors is taken into consideration may be understood as being displayed on the plane of the three of less dimensions. For example, a plurality of feature vectors having a high degree of relation may be distributed so as to be clustered on the plane of the three or less dimensions.

In addition, the user may perform an input for enlargement or reduction on the visualization interface 1310, and the visualization interface 1310 may enlarge or reduce the plane of the three or less dimensions according to the input, so that the user may recognize the distribution of the N feature vectors with the reduced dimensions more easily.

Meanwhile, as shown in FIG. 7B, the user may select the M data to be used as the learning data among the N data through the visualization interface 1310 displayed on the user terminal 3000.

In detail, the user may select the M feature vectors among the N feature vectors with the reduced dimensions displayed on the visualization interface 1310, and data corresponding to the selected feature vector may correspond to the data to be used as the learning data, that is, data included in the selection dataset. As described above, selection of one feature vector with reduced dimensions according to selection of the user may be displayed on the visualization interface 1310. According to an example shown in FIG. 7B, since the user has not yet selected a feature vector P2 in the visualization interface 1310 of FIG. 7A, the feature vector P2 displayed on the visualization interface 1310 may be displayed in the purple color, which is the first color, and when the user selects the feature vector P2, a color of the feature vector P2 in the visualization interface 1310 may be changed into a red color corresponding to a second color that is different from the first color so as to be displayed.

Meanwhile, after the user selects a feature vector on the visualization interface 1310 to allow a color of the feature vector to be changed into the second color, when the user performs an input for canceling the selection of the feature vector, the color of the feature vector may be changed back to the first color.

Through the configuration described above, the user may select the M data on the visualization interface 1310, and a result of the selection may be applied and displayed on the visualization interface 1310 in real time.

Figure 8:
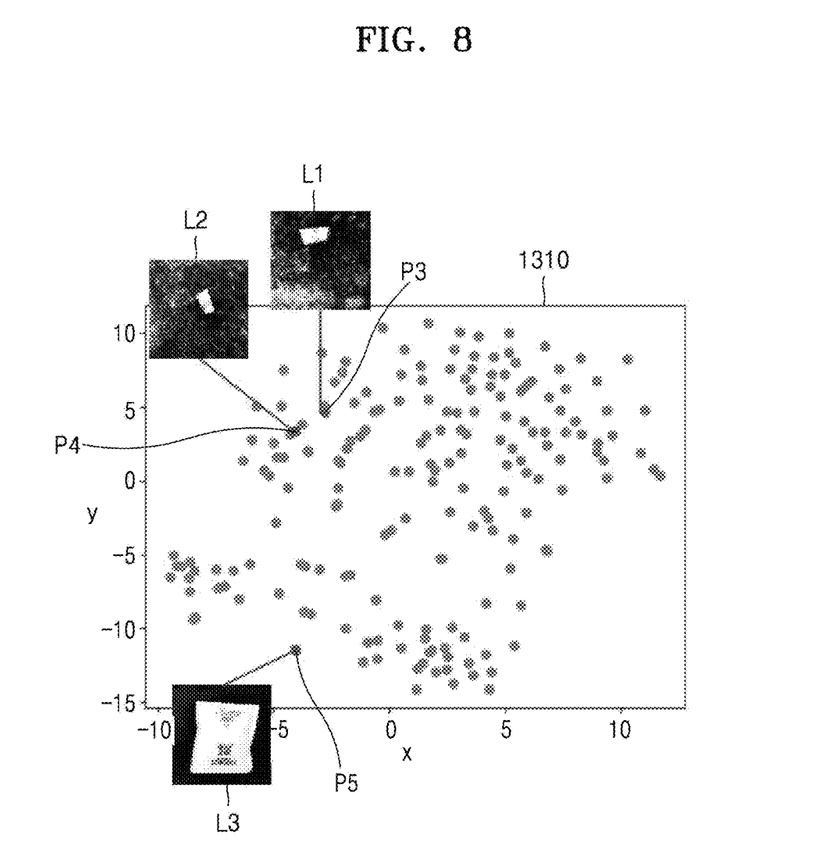
FIG. 8 schematically shows a visualization interface displayed when a user selects one feature vector displayed on the user terminal according to one embodiment of the present invention.

FIG. 8 schematically shows a visualization interface 1310 displayed when a user selects one feature vector displayed on the user terminal 3000 according to one embodiment of the present invention.

As shown in FIG. 8, when one feature vector is selected among the N feature vectors with the reduced dimensions displayed on the plane of the three or less dimensions, the visualization interface 1310 may display data corresponding to the one feature vector.

In detail, in order to allow the user to recognize the visualization result in the service server 1000 more easily, when the user selects one feature vector on the visualization interface 1310, the visualization interface 1310 may overlay and display data corresponding to the selected feature vector.

In more detail, as shown in FIG. 8, the user may perform a selection input for selecting one feature vector, preferably, a selection input for displaying data for the feature vector on the visualization interface 1310, and a feature vector P3, a feature vector P4, and a feature vector P5 have been shown in FIG. 8 as being selected by the user.

Meanwhile, the visualization interface 1310 may overlay and display selection data layers L1 to L3 on which the data corresponding to the feature vector selected by the user is displayed on the visualization interface 1310. According to an example of FIG. 8, data corresponding to the feature vector P3 selected according to the selection input for displaying the data performed by the user may be displayed on the selection data layer L1, data corresponding to the feature vector P4 may be displayed on the selection data layer L2, and data corresponding to the feature vector P5 may be displayed on the selection data layer L3.

Through the configuration described above, the user may recognize the data corresponding to the feature vector selected by the user on the visualization interface 1310, so that the user may recognize results of the visualization for the N data in the service server 1000 in more detail, and even when the user selects data, change target data for the feature vector may be recognized through the selection data layers L1 to L3 so that a change state may be determined more easily.

As shown in FIG. 8, the visualization interface 1310 may simultaneously overlay and display at least two selection data layers L1 to L3 for at least two feature vectors according to a selection input of the user.

In addition, although data in an image form has been shown as being displayed on the selection data layers L1 to L3 shown in FIG. 8, according to another embodiment of the present invention, the selection data layers L1 to L3 may be displayed in various forms according to the types of the data included in the original dataset. For example, when the data included in the original dataset is data in a text form, a text of the data corresponding to the selected feature vector may be displayed on the selection data layers L1 to L3, when the data included in the original dataset is data in an audio form, visual elements for reproducing an audio may be displayed on the selection data layers L1 to L3, and when the user performs a reproduction input on the selection data layers L1 to L3, the audio of the data may be reproduced.

Figure 9:
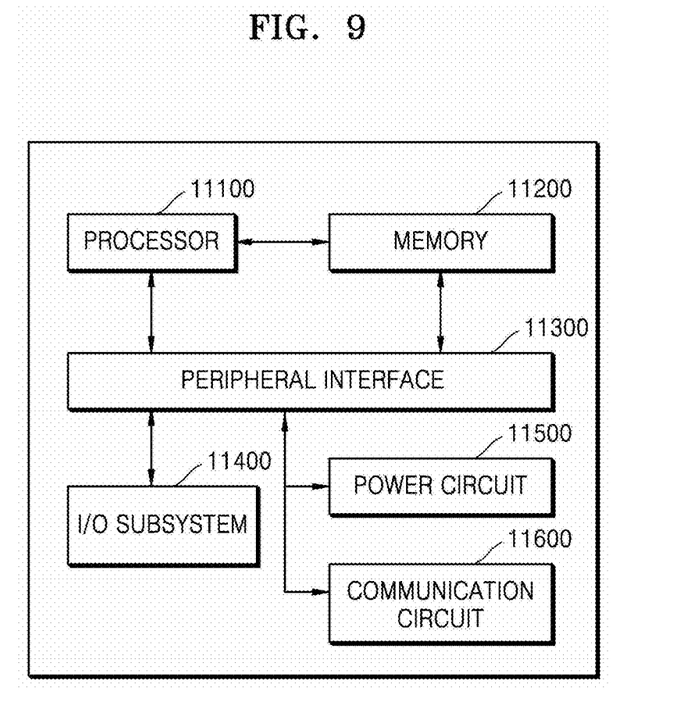
FIG. 9 schematically shows internal components of the computing device according to one embodiment of the present invention.

FIG. 9 schematically shows internal components of the computing device according to one embodiment of the present invention.

The service server 1000 shown in the above-described FIG. 1 may include components of the computing device 11000 shown in FIG. 9.

As shown in FIG. 9, the computing device 11000 may at least include at least one processor 11100, a memory 11200, a peripheral device interface 11300, an input/output subsystem (I/O subsystem) 11400, a power circuit 11500, and a communication circuit 11600. The computing device 11000 may correspond to the computing device 1000 shown in FIG. 1.

The memory 11200 may include, for example, a high-speed random access memory, a magnetic disk, an SRAM, a DRAM, a ROM, a flash memory, or a non-volatile memory. The memory 11200 may include a software module, an instruction set, or other various data necessary for the operation of the computing device 11000.

The access to the memory 11200 from other components of the processor 11100 or the peripheral interface 11300, may be controlled by the processor 11100.

The peripheral interface 11300 may combine an input and/or output peripheral device of the computing device 11000 to the processor 11100 and the memory 11200. The processor 11100 may execute the software module or the instruction set stored in memory 11200, thereby performing various functions for the computing device 11000 and processing data.

The input/output subsystem may combine various input/output peripheral devices to the peripheral interface 11300. For example, the input/output subsystem may include a controller for combining the peripheral device such as monitor, keyboard, mouse, printer, or a touch screen or sensor, if needed, to the peripheral interface 11300. According to another aspect, the input/output peripheral devices may be combined to the peripheral interface 11300 without passing through the I/O subsystem.

The power circuit 11500 may provide power to all or a portion of the components of the terminal. For example, the power circuit 11500 may include a power failure detection circuit, a power converter or inverter, a power status indicator, a power failure detection circuit, a power converter or inverter, a power status indicator, or any other components for generating, managing, and distributing the power.

The communication circuit 11600 may use at least one external port, thereby enabling communication with other computing devices.

Alternatively, as described above, if necessary, the communication circuit 11600 may transmit and receive an RF signal, also known as an electromagnetic signal, including RF circuitry, thereby enabling communication with other computing devices.

The above embodiment of FIG. 9 is merely an example of the computing device 11000, and the computing device 11000 may have a configuration or arrangement in which some components shown in FIG. 9 are omitted, additional components not shown in FIG. 9 are further provided, or at least two components are combined. For example, a computing device for a communication terminal in a mobile environment may further include a touch screen, a sensor or the like in addition to the components shown in FIG. 9, and the communication circuit 11600 may include a circuit for RF communication of various communication schemes (such as WiFi, 3G, LTE, Bluetooth, NFC, and Zigbee). The components that may be included in the computing device 11000 may be implemented by hardware, software, or a combination of both hardware and software which include at least one integrated circuit specialized in a signal processing or an application.

The methods according to the embodiments of the present invention may be implemented in the form of program instructions to be executed through various computing devices, thereby being recorded in a computer-readable medium. In particular, a program according to an embodiment of the present invention may be configured as a PC-based program or an application dedicated to a mobile terminal. The application to which the present invention is applied may be installed in the computing device 11000 through a file provided by a file distribution system. For example, a file distribution system may include a file transmission unit (not shown) that transmits the file according to the request of the computing device 11000.

The above-mentioned device may be implemented by hardware components, software components, and/or a combination of hardware components and software components. For example, the devices and components described in the embodiments may be implemented by using at least one general purpose computer or special purpose computer, such as a processor, a controller, an arithmetic logic unit (ALU), a digital signal processor, a microcomputer, a field programmable gate array (FPGA), a programmable logic unit (PLU), a microprocessor, or any other device capable of executing and responding to instructions. The processing device may execute an operating system (OS) and at least one software application executed on the operating system. In addition, the processing device may access, store, manipulate, process, and create data in response to the execution of the software. For the further understanding, some cases may have described that one processing device is used, however, it is well known by those skilled in the art that the processing device may include a plurality of processing elements and/or a plurality of types of processing elements. For example, the processing device may include a plurality of processors or one processor and one controller. In addition, other processing configurations, such as a parallel processor, are also possible.

The software may include a computer program, a code, and an instruction, or a combination of at least one thereof, and may configure the processing device to operate as desired, or may instruct the processing device independently or collectively. In order to be interpreted by the processor or to provide instructions or data to the processor, the software and/or data may be permanently or temporarily embodied in any type of machine, component, physical device, virtual equipment, computer storage medium or device, or in a signal wave to be transmitted. The software may be distributed over computing devices connected to networks, so as to be stored or executed in a distributed manner. The software and data may be stored in at least one computer-readable recording medium.

The method according to the embodiment may be implemented in the form of program instructions to be executed through various computing mechanisms, thereby being recorded in a computer-readable medium. The computer-readable medium may include program instructions, data files, data structures, and the like, independently or in combination thereof. The program instructions recorded on the medium may be specially designed and configured for the embodiment, or may be known to those skilled in the art of computer software so as to be used. An example of the computer-readable medium includes a magnetic medium such as a hard disk, a floppy disk and a magnetic tape, an optical medium such as a CD-ROM and a DVD, a magneto-optical medium such as a floptical disk, and a hardware device specially configured to store and execute a program instruction such as ROM, RAM, and flash memory. An example of the program instruction includes a high-level language code to be executed by a computer using an interpreter or the like as well as a machine code generated by a compiler. The above hardware device may be configured to operate as at least one software module to perform the operations of the embodiments, and vise versa.

According to one embodiment of the present invention, a visualization interface that allows a user to select a predetermined number of data among a plurality of data included in an original dataset may be provided to the user, so that the user can select data for constructing learning data required to train a machine learning model.

According to one embodiment of the present invention, dimensions of a plurality of feature vectors for each of a plurality of data may be reduced, and the feature vectors with the reduced dimensions may be displayed on a plane of three or less dimensions, so that the user can easily and visually recognize distribution of the data.

According to one embodiment of the present invention, the visualization interface displayed on a terminal of the user may include the plane of the three or less dimensions including the feature vectors with the reduced dimensions, and the user may select the feature vector on the plane to cancel selection of a selected feature vector or to select an unselected feature vector, so that the user can easily select the data.

According to one embodiment of the present invention, the visualization interface displayed on the terminal of the user may include the plane of the three or less dimensions including the feature vectors with the reduced dimensions, and when the user selects one feature vector on the plane, data for the feature vector may be displayed on the terminal of the user, so that the user can recognize the data more easily.

Although the above embodiments have been described with reference to the limited embodiments and drawings, however, it will be understood by those skilled in the art that various changes and modifications may be made from the above-mentioned description. For example, even though the described descriptions may be performed in an order different from the described manner, and/or the described components such as system, structure, device, and circuit may be coupled or combined in a form different from the described manner, or replaced or substituted by other components or equivalents, appropriate results may be achieved.

Therefore, other implementations, other embodiments, and equivalents to the claims are also within the scope of the following claims.

What is claimed is:

1. A method for visualizing data to select data to be used for labeling, which is performed by a service server configured to communicate with a user terminal and including at least one processor and at least one memory, the method comprising:
    a feature vector derivation step of inputting an original dataset including N data (N is a natural number greater than or equal to 2) for representing specific features of an original object provided by the user terminal to a feature embedding model so as to derive a feature vector for each of the N data, wherein the feature embedding model has a plurality of encoders configured to process different types of input data, such that, when a first input data and second input data describe a same concept or object but are of different types, first feature vectors derived from the first input data by a first encoder and second feature vectors derived from the second input data by a second encoder are identical or similar to each other in a shared embedding space;
    a dimension reduction step of reducing dimensions of each of the N feature vectors derived through the feature vector derivation step to three or less dimensions; and
    a visualization interface provision step comprising:
    displaying the N feature vectors with the reduced dimensions on a plane of the three or less dimensions, and providing a visualization interface in which the plane of the three or less dimensions including the N feature vectors with the reduced dimensions is visually displayed to the user terminal, wherein the visualization interface is configured to (1) display the N feature vectors with the reduced dimensions in a first color, (2) change the first color of one or more of the N feature vectors that are selected by the user via the user terminal to a second color, and (3) return the second color back to the first color upon cancellation of the selection by the user; and
    overlaying information from the original object corresponding to a specific data point representing the N feature vectors the user has selected near the selected data point on the visualization interface, wherein the information is presented as one or more of text information, visual information providing additional context, and audio information.

2. The method of claim 1, wherein the method for visualizing the data to select the data to be used for the labeling uses M data (where M is a natural number that is less than N) corresponding to M feature vectors with reduced dimensions selected by a user on the plane of the three or less dimensions included in the visualization interface displayed on the user terminal as a target of a labeling operation.

3. A service server configured to communicate with a user terminal and including at least one processor and at least one memory so as to perform a method for visualizing data to select data to be used for labeling, wherein the service server is configured to perform:
- a feature vector derivation step of inputting an original dataset including N data (N is a natural number greater than or equal to 2) for representing specific features of an original object provided by the user terminal to a feature embedding model so as to derive a feature vector for each of the N data, wherein the feature embedding model has a plurality of encoders configured to process different types of input data, such that, when a first input data and second input data describe a same concept or object but are of different types, first feature vectors derived from the first input data by a first encoder and second feature vectors derived from the second input data by a second encoder are identical or similar to each other in a shared embedding space;
- a dimension reduction step of reducing dimensions of each of the N feature vectors derived through the feature vector derivation step to three or less dimensions; and
- a visualization interface provision step comprising:
- displaying the N feature vectors with the reduced dimensions on a plane of the three or less dimensions, and providing a visualization interface in which the plane of the three or less dimensions including the N feature vectors with the reduced dimensions is visually displayed to the user terminal, wherein the visualization interface is configured to (1) display the N feature vectors with the reduced dimensions in a first color, (2) change the first color of one or more of the N feature vectors that are selected by the user via the user terminal to a second color, and (3) return the second color back to the first color upon cancellation of the selection by the user; and
- overlaying information from the original object corresponding to a specific data point representing the N feature vectors the user has selected near the selected data point on the visualization interface, wherein the information is presented as one or more of text information, visual information providing additional context, and audio information.

4. A non-transitory computer-readable medium for implementing a method for visualizing data to select data to be used for labeling, which is performed by a service server configured to communicate with a user terminal and including at least one processor and at least one memory, wherein the computer-readable medium includes computer-executable instructions for allowing the service server to perform:
- a feature vector derivation step of inputting an original dataset including N data (N is a natural number greater than or equal to 2) for representing specific features of an original object provided by the user terminal to a feature embedding model so as to derive a feature vector for each of the N data, wherein the feature embedding model has a plurality of encoders configured to process different types of input data, such that, when a first input data and second input data describe a same concept or object but are of different types, first feature vectors derived from the first input data by a first encoder and second feature vectors derived from the second input data by a second encoder are identical or similar to each other in a shared embedding space;
- a dimension reduction step of reducing dimensions of each of the N feature vectors derived through the feature vector derivation step to three or less dimensions; and
- a visualization interface provision step comprising:
- displaying the N feature vectors with the reduced dimensions on a plane of the three or less dimensions, and providing a visualization interface in which the plane of the three or less dimensions including the N feature vectors with the reduced dimensions is visually displayed to the user terminal, wherein the visualization interface is configured to (1) display the N feature vectors with the reduced dimensions in a first color, (2) change the first color of one or more of the N feature vectors that are selected by the user via the user terminal to a second color, and (3) return the second color back to the first color upon cancellation of the selection by the user; and
- overlaying information from the original object corresponding to a specific data point representing the N feature vectors the user has selected near the selected data point on the visualization interface, wherein the information is presented as one or more of text information, visual information providing additional context, and audio information.

* * * * *